United States Patent [19]
Nakaura et al.

[11] Patent Number: 5,752,751
[45] Date of Patent: May 19, 1998

[54] ANTI-SKID CONTROL APPARATUS WITH BRAKE FAILURE DETECTION MEANS

[75] Inventors: Tohru Nakaura, Itami; Shigeki Suzuki, Hamamatsu; Yasushi Tanabe, Hamamatsu; Yoshitaka Suzuki, Hamamatsu, all of Japan

[73] Assignees: Sumitomo Electric Industries, Ltd., Osaka; Suzuki Motor Corporation, Shizuoka-ken, both of Japan

[21] Appl. No.: 578,278

[22] Filed: Dec. 26, 1995

[30] Foreign Application Priority Data

Dec. 28, 1994 [JP] Japan ..................... 6-326852

[51] Int. Cl.⁶ ......................................... B60T 8/58
[52] U.S. Cl. ............... 303/122.06; 303/170; 303/DIG. 2
[58] Field of Search .................. 303/122, 122.02, 303/122.06, 122.07, 122.09, DIG. 1, DIG. 2, 170

[56] References Cited

U.S. PATENT DOCUMENTS 3,920,284  11/1975  Lane et al. ............ 303/122.06
4,003,607  1/1977   Haney et al. .......... 303/122.06

FOREIGN PATENT DOCUMENTS

| 2335690 | 1/1974  | Germany | 303/122.02 |
|---------|---------|---------|------------|
| 152648  | 9/1983  | Japan . |            |
| 240459  | 10/1988 | Japan . |            |
| 227384  | 8/1994  | Japan . |            |

*Primary Examiner*—Peter M. Poon
*Attorney, Agent, or Firm*—Greenblum & Bernstein, P.L.C.

[57] ABSTRACT

A vehicular anti-skid control apparatus comprises a differential pressure detector for detecting the pressure difference inside brake lines of separate brake channels, a brake failure detector for detecting failure in one of the brake channels based on the anti-skid control state of each brake channel, a brake failure evaluator for evaluating failure of the brake system based on both output signals of the differential pressure detector and brake failure detector wherein the anti-skid control method is changed from normal anti-skid control to a particular anti-skid control when a brake failure occurs.

8 Claims, 7 Drawing Sheets

ANTI-SKID CONTROL APPARATUS WITH BRAKE FAILURE DETECTION MEANS

BACKGROUND OF THE INVENTION

1. Field of the Invention

The present invention relates to an anti-skid control apparatus for vehicles comprising a brake system separated into a front brake channel and a discrete rear brake channel.

2. Description of the Prior Art

Anti-skid control apparatuses for vehicles comprising a brake line system separated into a front brake channel and a rear brake channel must generally give priority to maintaining the directional stability of the vehicle over the braking force of the rear wheels when applying anti-skid control to the rear wheels. As a result, select-low control, a method whereby the right and left wheels are evaluated for a locking tendency, and the brake fluid pressure of the right and left wheels is simultaneously controlled based on the wheels exhibiting a tendency to lock, is normally used.

However, if the front brake channel has failed and anti-skid control is accomplished using only the rear brake channel, vehicle speed will not decline sufficiently and the total required stopping distance accordingly increases.

One method, described in Japanese patent laid-open H6-227384 (1994-227384), overcoming this problem may switch from the select-low control method described above to select-high control, which is similar to select-low control except that the brake fluid pressure is controlled based on the wheels not exhibiting a tendency to lock; may change, the rear wheel slip threshold to permit more slipping than when the front brakes are normal; or may set the rear wheel pressure reducing pulse time shorter than when the front brakes are normal., after a predetermined period has passed with anti-skid control applied to one of the rear wheels but to neither of the front wheels.

With the method described in Japanese patent laid-open H6-227384 (1994-227384), however, the brake failure state is detected in software alone, permitting brake failure to be detected only after the predetermined period has passed, and thus not obtaining sufficient speed reduction during the initial braking period.

Furthermore, if brake failure is erroneously detected and the brake failure control mode is entered when the rear wheels lock first due, for example, to a road surface with an uneven coefficient of friction, rear wheel slipping is effectively over-compensated because the brakes are functioning normally, and vehicle stability deteriorates.

SUMMARY OF THE INVENTION

Therefore, an object of the present invention is to provide an anti-skid control apparatus for vehicles comprising a brake line system separated into a front brake channel and a rear brake channel, and relates particularly to such an anti-skid control apparatus whereby failure of the front brake channel can be quickly and accurately detected, and sufficient braking force can therefore be obtained.

To achieve the aforementioned object, an anti-skid control apparatus according to the present invention comprises a differential pressure detection means for detecting the pressure difference inside the brake lines of the separate brake channels, and outputting a differential pressure detection signal when the pressure difference exceeds a predetermined level; a brake failure detection means for detecting failure in one of the brake channels based on the anti-skid control state of each brake channel, and outputting a brake failure detection signal when a brake channel failure is detected; and a brake failure evaluating means for evaluating failure of the brake system when both the differential pressure detection signal and the brake failure detection signal are detected, and outputting the brake failure evaluation signal. Thus comprised, the anti-skid control apparatus changes the anti-skid control method from normal anti-skid control to a particular anti-skid control method while the brake failure evaluating means outputs the brake failure evaluation signal.

The brake failure detection means of an anti-skid control apparatus according to an embodiment of the invention outputs the brake failure detection signal when anti-skid control is applied to one of the rear wheels but is not applied to either of the front wheels.

In the anti-skid control apparatus according to another embodiment of the invention, the particular anti-skid control method accomplishes anti-skid control by setting the wheel slip threshold value used to evaluate wheel slipping to a higher than normal value.

In the anti-skid control apparatus according to a further embodiment of the invention, the particular anti-skid control method accomplishes anti-skid control by setting the pressure reducing time of the rear brake fluid pressure to a shorter than normal time.

In the anti-skid control apparatus according to one more embodiment of the invention, the particular anti-skid control method accomplishes anti-skid control by switching rear wheel braking force control between select-low control and select-high control where select-low and select-high control evaluate the right and left wheels for a locking tendency, select-low control simultaneously controls the brake fluid pressure of the right and left wheels based on the wheels exhibiting a tendency to lock, and select-high control simultaneously controls the brake fluid pressure of the right and left wheels based on the wheels not exhibiting a tendency to lock.

When the pressure difference between the brake channels exceeds a predetermined value, and a brake system failure is detected based on the anti-skid control status of each wheel, the anti-skid control apparatus according to the invention switches from normal anti-skid control to an anti-skid control method particularly configured for use during brake failure. It is thereby possible to quickly detect brake failure and switch to anti-skid control appropriate to brake failure in time to achieve sufficient braking force during the initial braking period; to prevent a false brake failure determination and a drop in vehicle (control) stability when the rear wheels lock first during normal brake operation; and to accurately detect brake failure without making a false brake failure determination when the differential pressure detection means fails and continuously outputs the differential pressure detection signal.

The brake failure detection means of the anti-skid control apparatus according to an embodiment of the invention outputs the brake failure detection signal when anti-skid control is applied to one of the rear wheels but to neither of the front wheels. It is thereby possible to quickly detect brake failure and switch to anti-skid control appropriate to brake failure in time to achieve sufficient braking force during the initial braking period; to prevent a false brake failure determination and a drop in vehicle (control) stability when the rear wheels lock first during normal brake operation; and to accurately detect brake failure without making a false brake failure determination when the differential pressure detection means fails and continuously outputs the differential pressure detection signal.

The particular anti-skid control method selected by the anti-skid control apparatus according to another embodiment of the invention accomplishes anti-skid control by setting the wheel slip threshold value used to evaluate wheel slipping to a higher than normal value. It is thereby possible to quickly detect brake failure and switch to anti-skid control appropriate to brake failure in time to achieve sufficient braking force during the initial braking period; to prevent a false brake failure determination and a drop in vehicle (control) stability when the rear wheels lock first during normal brake operation; and to accurately detect brake failure without making a false brake failure determination when the differential pressure detection means fails and continuously outputs the differential pressure detection signal.

The particular anti-skid control method selected by the anti-skid control apparatus according to a further embodiment of the invention accomplishes anti-skid control by setting the pressure reducing time of the rear brake fluid pressure to a shorter than normal time. It is thereby possible to quickly detect brake failure and switch to anti-skid control appropriate to brake failure in time to achieve sufficient braking force during the initial braking period; to prevent a false brake failure determination and a drop in vehicle (control) stability when the rear wheels lock first during normal brake operation; and to accurately detect brake failure without making a false brake failure determination when the differential pressure detection means fails and continuously outputs the differential pressure detection signal.

The particular anti-skid control method selected by the anti-skid control apparatus according to one more embodiment of the invention accomplishes anti-skid control by switching rear wheel braking force control between select-low control and select-high control. It is thereby possible to quickly detect brake failure and switch to anti-skid control appropriate to brake failure in time to achieve sufficient braking force during the initial braking period; to prevent a false brake failure determination and a drop in vehicle (control) stability when the rear wheels lock first during normal brake operation; and to accurately detect brake failure without making a false brake failure determination when the differential pressure detection means fails and continuously outputs the differential pressure detection signal.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
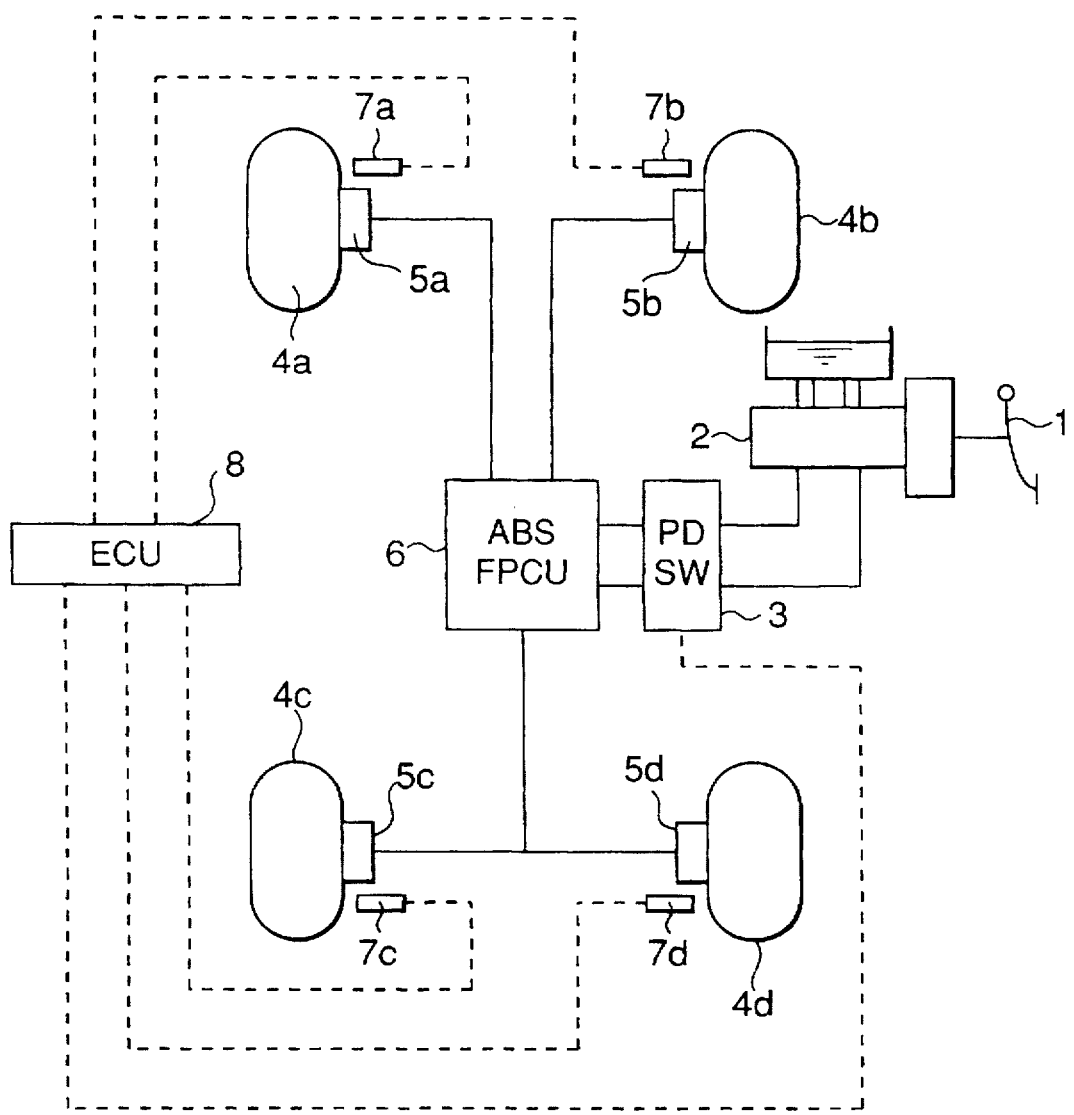
FIG. 1 is a simplified system diagram of an antilock brake control system (ABS) equipped with the anti-skid control apparatus of the present invention for a four-wheel motor vehicle in which the brake system is separated into discrete front and rear brake channels.
Figure 2:
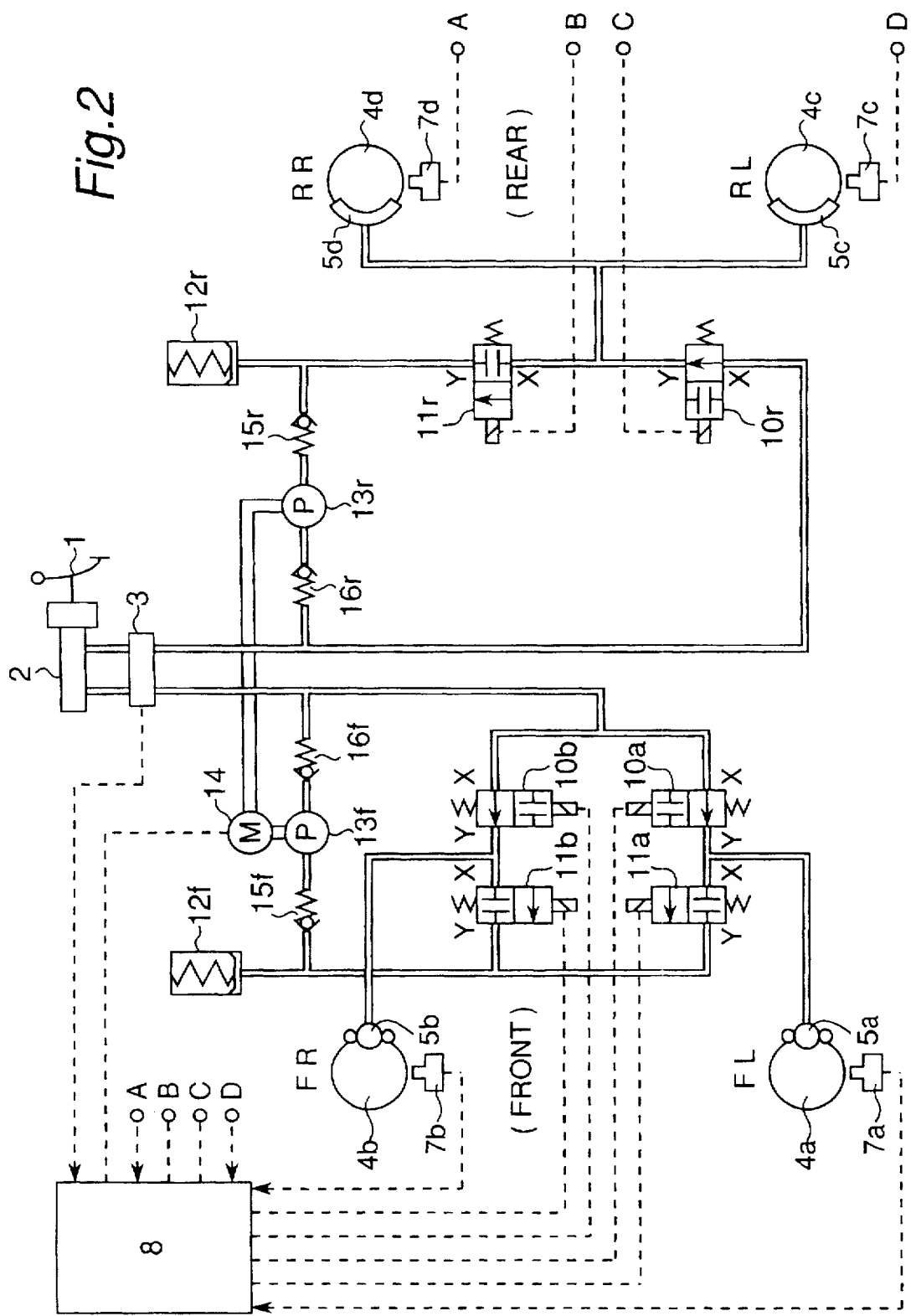
FIG. 2 is a system diagram of an antilock brake control system showing the ABS fluid pressure control unit shown in FIG. 1.

The preferred embodiment of an anti-skid control apparatus according to the present invention is described hereinbelow with reference to the accompanying figures. FIG. 1 is a simplified system diagram of an antilock brake control system (ABS) equipped with the anti-skid control apparatus of the present invention for a four-wheel motor vehicle in which the brake system is separated into discrete front and rear brake channels, each commonly connecting the right and left front and rear brakes, respectively. FIG. 2 is a system diagram of an antilock brake control system showing the ABS fluid pressure control unit 6 shown in FIG. 1.

As shown in FIG. 1, the brake system is a two-channel (front and rear channels) brake system in which the front channel is connected to both right and left front brakes, and the rear channel is connected to both right and left rear brakes. The master cylinder 2 converts depression of the brake pedal 1 to brake fluid pressure supplied to the brake lines through the differential pressure switch 3, which as the differential pressure detection means detects the pressure difference between the brake fluid pressure in the two brake channels, and outputs the detected differential pressure as a binary signal. The ABS fluid pressure control unit 6 of this system then controls the braking force by increasing, decreasing, or maintaining the brake fluid pressure in the wheel cylinders 5a, 5b, 5c, and 5d of the four wheels 4a, 4b, 4c, and 4d connected to the two (front and rear) brake channels. Note that the indices a, b, c, and d above and as used below indicate the left front wheel, the right front wheel, the left rear wheel, and the right rear wheel, respectively.

The ABS fluid pressure control unit 6 is discretely connected to the left front wheel cylinder 5a and the right front wheel cylinder 5b, and is connected to the left and right rear wheel cylinders 5c and 5d in common.

The speed of each wheel is detected and output as the corresponding wheel speed signal by wheel speed sensors 7a, 7b, 7c, and 7d, which are connected to the corresponding wheels. Each of the wheel speed sensors 7a, 7b, 7c, and 7d is also connected to the electronic control unit 8, which is described below.

The electronic control unit 8 is further connected to the differential pressure switch 3 and the ABS fluid pressure control unit 6. The electronic control unit 8 executes various calculations and evaluations based on the wheel speed signals input from the wheel speed sensors 7a–7d and the differential pressure detection signal input from the differential pressure switch 3, and then outputs the appropriate control signal to the ABS fluid pressure control unit 6 to control brake system operation. This ABS control operation is described in detail below with reference to the ABS fluid pressure control unit 6 shown in FIG. 2.

As shown in FIG. 2, the ABS fluid pressure control unit 6 comprises inlet valves 10a, 10b, and 10r, which are normally-open on/off solenoid valves; outlet valves 11a, 11b, and 11r, which are normally-closed on/off solenoid valves; reservoir 12f for temporarily storing the brake fluid purged from wheel cylinders 5a and 5b when the brake fluid pressure of wheel cylinders 5a and 5b is reduced; and reservoir 12r for temporarily storing the brake fluid purged from wheel cylinders 5c and 5d when the brake fluid pressure thereof is reduced.

The ABS fluid pressure control unit 6 further comprises a front pump 13f for pumping the brake fluid stored in the front reservoir 12f to the master cylinder 2; a corresponding rear pump 13r for pumping the brake fluid stored in the rear reservoir 12r to the master cylinder 2; a common motor 14 for driving both front and rear pumps 13f and 13r; and check valves 15f, 15r, 16f, and 16r. Note that the indices f and r as used herein indicate front and rear wheel components, respectively.

The master cylinder 2 is connected through the differential pressure switch 3 to port X of each inlet valve 10a, 10b, and 10r. Ports Y of inlet valves 10a and 10b are connected to port X of the corresponding outlet valves 11a and 11b, and to the corresponding front wheel cylinders 5a and 5b. Ports Y of outlet valves 11a and 11b are connected to the front reservoir 12f. Port Y of inlet valve 10r is similarly connected to port X of outlet valve 11r, and to the rear wheel cylinders 5c and 5d, and port Y of the outlet valve 11r is connected to the rear reservoir 12r.

One side of the front pump 13 f is connected through check valve 15 f to the connection between ports Y of outlet valves 11 a and 11 b and the front reservoir 12f, and the other side of the front pump 13 f is connected through another check valve 16f and the differential pressure switch 3 to the master cylinder 2. In a similar manner, one side of the rear pump 13r is connected through check valve 15r to the connection between port Y of outlet valve 11r and the rear reservoir 12r, and the other side of the rear pump 13r is connected through check valve 16r and differential pressure switch 3 to the master cylinder 2. Note that check valves 15f and 15r are disposed to permit the brake fluid to flow in only one direction to the corresponding pumps from the connections between ports Y of the outlet valves and the corresponding reservoirs, and check valves 16f and 16r are disposed to permit the brake fluid to flow in only one direction to the master cylinder 2 from the corresponding pumps.

The electronic control unit 8 is connected to the differential pressure switch 3; the wheel speed sensors 7a–7d; the solenoids of the inlet valves 10a, 10b, and 10r and the outlet valves 11a, 11b, and 11r; and the motor 14. The electronic control unit 8 performs various calculations and evaluations based on the digital signal supplied from the differential pressure switch 3, and the wheel speed signals from the wheel speed sensors 7a–7d, and then outputs the necessary control signals to the motor 14, the solenoids of the inlet valves 10a, 10b, and 10r, and the solenoids of the outlet valves 11a, 11b, and 11r to appropriately control brake operation.

More specifically, the electronic control unit 8 calculates the speed of each wheel based on the signals from the wheel speed sensors 7a–7d, then calculates the deceleration of each wheel from the speed of each wheel, and then calculates the estimated vehicle speed from the calculated speed and deceleration of each wheel. Note that the wheel speed, wheel deceleration, and estimated vehicle speed can be calculated using various known methods, and further description thereof is thus omitted below.

When an asynchronous state in which the difference between the calculated estimated vehicle speed and any wheel speed signal exceeds a constant threshold value is detected, it is determined that at least one of the wheels has locked. A "reduce pressure signal" commanding the brake system to reduce the brake fluid pressure is then output to the inlet valves 10a, 10b, and 10r, outlet valves 11a, 11b, and 11r; and the motor 14, and the brake system is driven in the pressure reduction mode, i.e., current is supplied to excite the solenoids of the inlet valves 10a, 10b, and 10r, and the solenoids of the outlet valves 11a, 11b, and 11r; and the motor 14 is operated to run the pumps 13 f and 13r.

The pressure reduction mode thus closes ports X and Y of inlet valves 10a, 10b, and 10r, thereby shutting off the supply of brake fluid from the master cylinder 2; opens ports X and Y of outlet valves 11a, 11b, and 11r to open the brake fluid outlet channels allowing the brake fluid to flow from the wheel cylinders into the reservoirs 12f and 12r; and thus reduces the brake fluid pressure in each of the wheel cylinders 5a–5d. When the brake fluid pressure in the wheel cylinders 5a–5d begins to drop, pumps 13 f and 13r operate to return the brake fluid from the reservoirs 12f and 12r back to the master cylinder 2.

When, for example, the difference between the estimated vehicle speed and the wheel speed drops below the predetermined threshold value and a synchronized state is resumed because of the reduction in the brake fluid pressure of the wheel cylinders 5a–5d, the electronic control unit 8 determines that the wheels are no longer locked. To therefore increase the brake fluid pressure, the electronic control unit 8 stops the current supply to the inlet valves 10a, 10b, and 10r and the outlet valves 11a, 11b, and 11r. This causes ports X and Y of the inlet valves 10a, 10b, and 10r to open, opening the brake fluid supply from the master cylinder 2, and causes ports X and Y of the outlet valves 11a, 11b, and 11r to close, stopping the outflow of brake fluid to the reservoirs and thus causing the brake fluid pressure in the wheel cylinders to rise.

Figure 3:
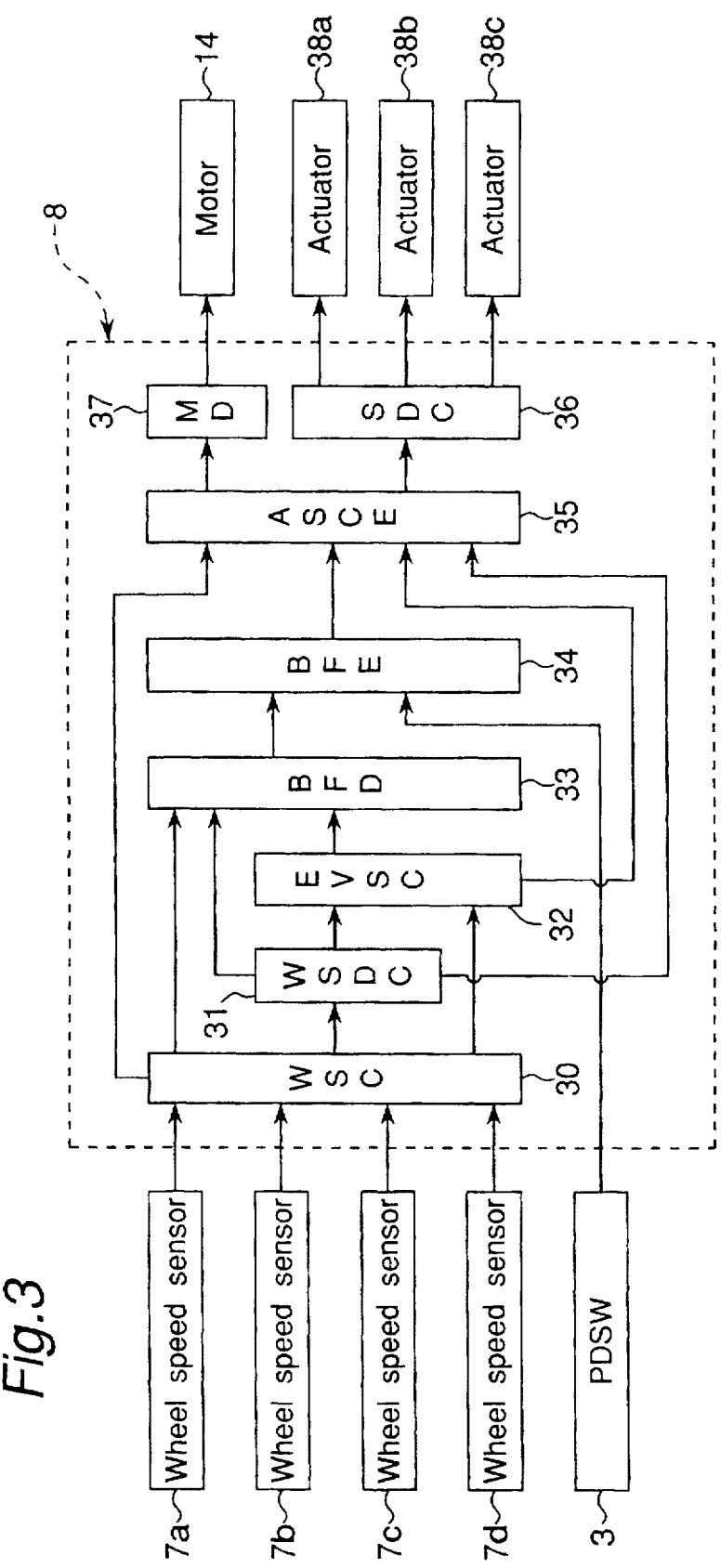
FIG. 3 is a block diagram of the anti-skid control apparatus according to the present invention.

FIG. 3 is a block diagram of the anti-skid control apparatus according to the present invention. The preferred embodiment of this anti-skid control apparatus applicable to an ABS as described above is described next with reference to FIG. 3. Note that like parts in FIGS. 1, 2, and 3 are identified by like reference numbers, and further description thereof is omitted below.

As shown in FIG. 3, the electronic control unit 8 comprises a wheel speed calculator 30, wheel speed deceleration calculator 31, estimated vehicle speed calculator 32, brake failure detector 33, brake failure evaluator 34, anti-skid control evaluator 35, solenoid drive controller 36, and motor driver 37.

The wheel speed calculator 30 calculates the speed of each wheel based on the wheel speed signals input from the wheel speed sensors 7a–7d.

The wheel speed deceleration calculator 31 then calculates the deceleration of each wheel from the wheel speed of each wheel calculated by the wheel speed calculator 30.

The estimated vehicle speed calculator 32 then calculates the estimated vehicle speed from each wheel speed and each wheel deceleration.

The brake failure detector 33 then checks for failure of the brake system based on the calculated wheel speeds, wheel deceleration, and estimated vehicle speed, and outputs the brake failure detection signal when a failure in the brake system is detected.

The brake failure evaluator 34 then evaluates failure of the brake system based on the differential pressure detection signal, which indicates that the differential pressure switch 3 has detected a pressure difference greater than the predetermined threshold value, and the brake failure detection signal. When a brake system failure is determined to have occurred, the brake failure evaluator 34 outputs the brake failure evaluation signal.

The anti-skid control evaluator 35 determines whether to apply ABS control based on the wheel speed signals, wheel deceleration, and estimated vehicle speed, and outputs the ABS control request signal when ABS control is determined necessary. If the brake failure evaluation signal is also being input from the brake failure evaluator 34, the anti-skid control evaluator 35 selects a particular ABS control method.

In response to the ABS control request signal from the anti-skid control evaluator 35, the solenoid drive controller 36 calculates the pressure reduction control command values that are used as the control signals for the inlet valves 10a, 10b, 10r and the outlet valves 11a, 11b, 11r, and thus controls operation of the solenoids for the inlet valves 10a, 10b, 10r and the outlet valves 11a, 11b, 11r according to the calculated pressure reduction control command values. Also in response to the ABS control request signal, the motor driver 37 controls the motor 14 to drive the pumps 13f and 13r.

Note, further, that to simplify the following description, inlet valve 10a and outlet valve 11a are shown as actuator 38a, inlet valve 10b and outlet valve 11b as actuator 38b, and inlet valve 10r and outlet valve 11r as actuator 38r in FIG. 3. Actuator 38a thus adjusts the brake fluid pressure of the left front wheel cylinder 5a; actuator 38b adjusts the brake fluid pressure of the right front wheel cylinder 5b; and actuator 38r adjusts the brake fluid pressure of the rear wheel cylinders 5c and 5d. The solenoid drive controller 36 also controls operation of the actuators 38a, 38b, and 38r by means of the pressure reduction control command values calculated as described above.

Note, further, that the inputs to the wheel speed calculator 30 are connected to the wheel speed sensors 7a–7d, and the wheel speed calculator 30 outputs to the wheel speed deceleration calculator 31, estimated vehicle speed calculator 32, brake failure detector 33, and anti-skid control evaluator 35. The wheel speed deceleration calculator 31 outputs to the estimated vehicle speed calculator 32, brake failure detector 33, and anti-skid control evaluator 35. The estimated vehicle speed calculator 32 outputs to the brake failure detector 33 and anti-skid control evaluator 35. The brake failure detector 33 outputs to the brake failure evaluator 34. The brake failure evaluator 34 outputs to the anti-skid control evaluator 35. The anti-skid control evaluator 35 outputs to the solenoid drive controller 36 and the motor driver 37. The solenoid drive controller 36 outputs to actuators 38a, 38b, and 38r, and the motor driver 37 outputs to the motor 14.

The process whereby the anti-skid control apparatus of the present invention as shown in FIG. 3 detects failure of the front brake channel and selects the anti-skid control method when brake failure is detected is described below with reference to the flow charts shown in FIGS. 4 and 5.

Figure 4:
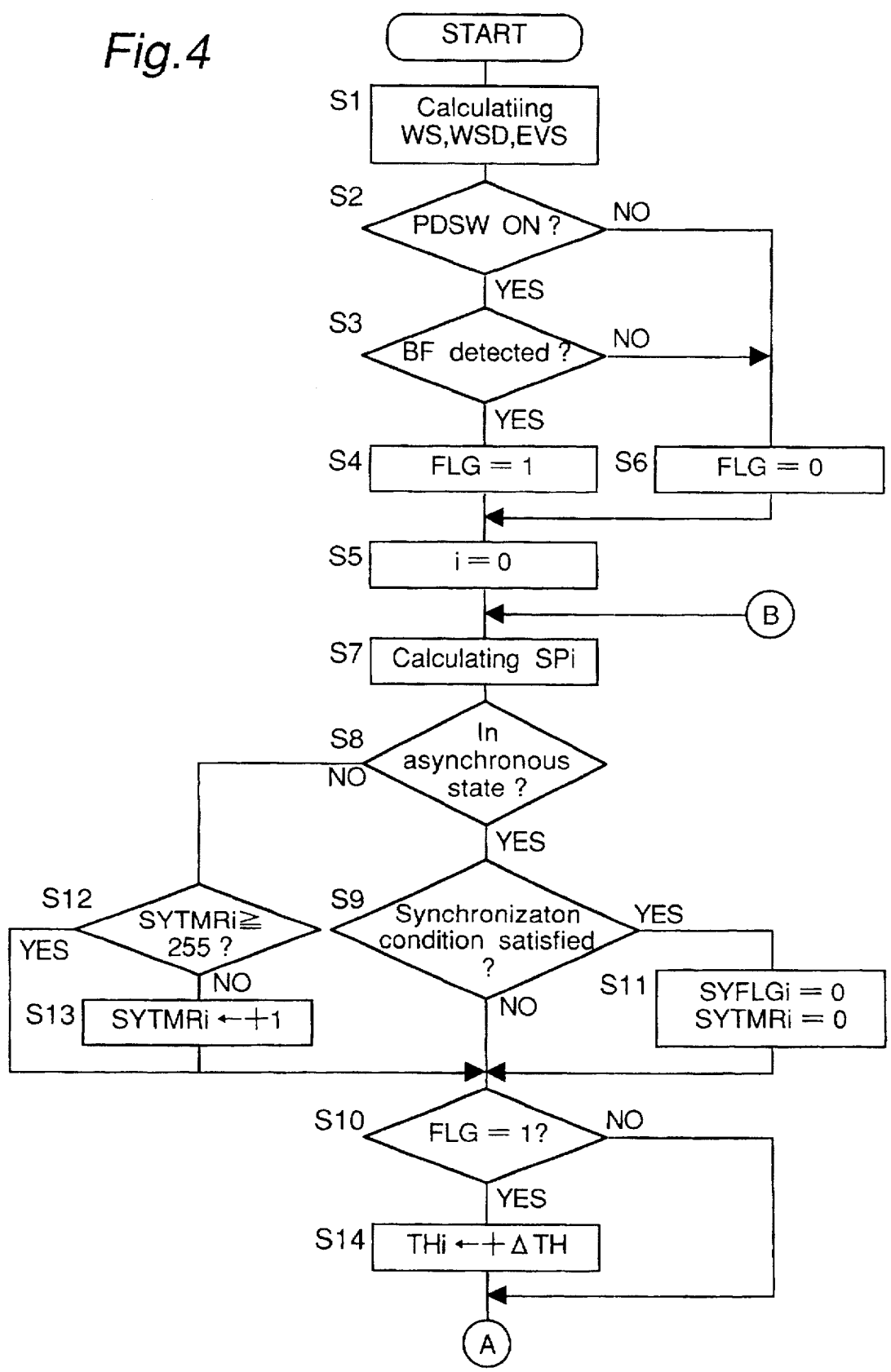
FIG. 4 is a flow chart of the process whereby the anti-skid control apparatus shown in FIG. 3 detects brake system failure, and selects the anti-skid control method appropriate to brake failure detection.
Figure 5:
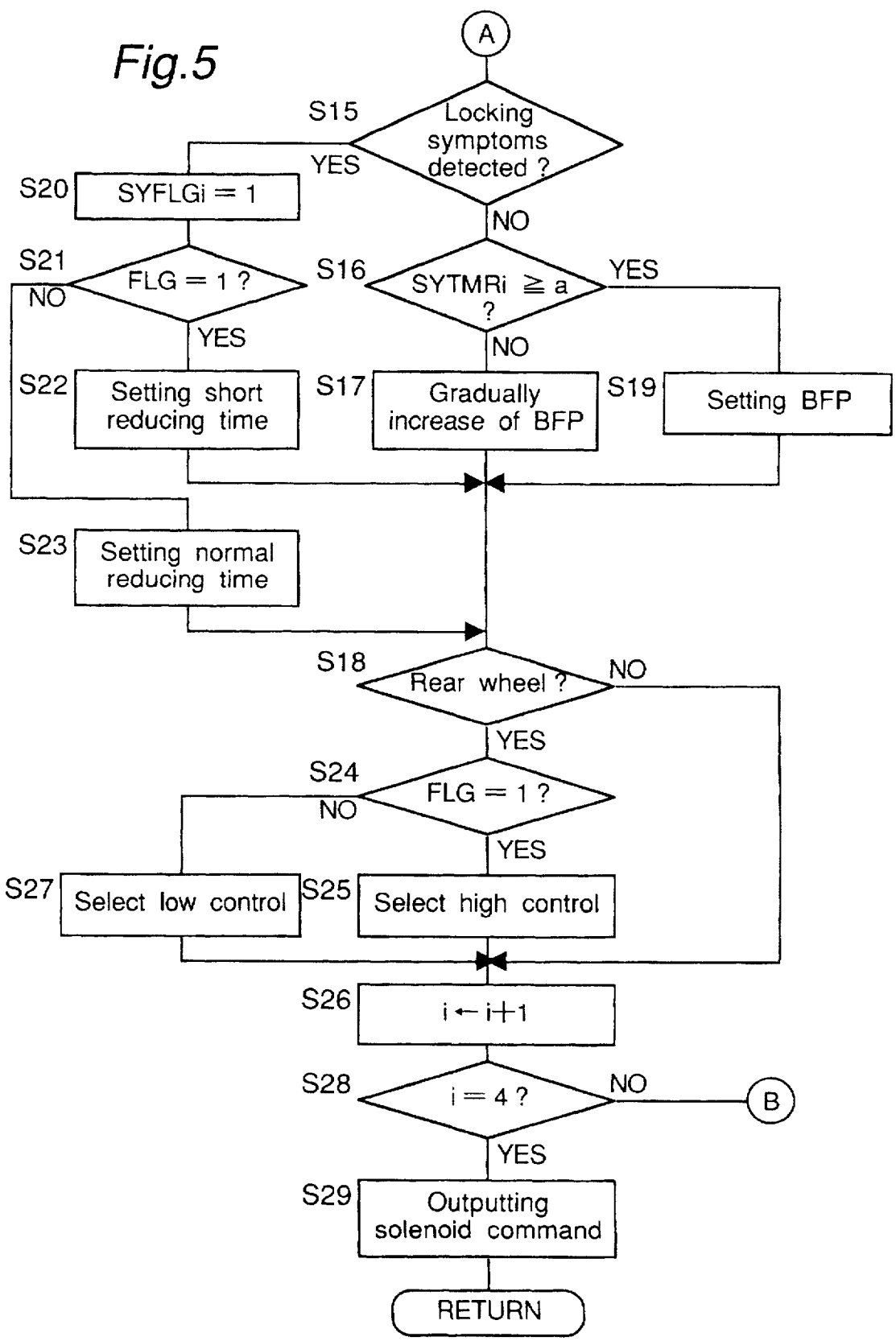
FIG. 5 is a continuation of the flow chart shown in FIG. 4.

Starting at step S1 in FIG. 4, the wheel speed calculator 30 first calculates each wheel speed based on the signal data supplied from the wheel speed sensors 7a–7d; the wheel speed deceleration calculator 31 calculates the deceleration of each wheel based on the wheel speed values calculated by the wheel speed calculator 30; and the estimated vehicle speed calculator 32 then calculates the estimated vehicle speed, which is an estimate of the actual vehicle speed, from the previously calculated wheel speed and wheel deceleration values.

At step S2, the brake failure evaluator 34 determines whether the differential pressure switch 3 is ON, a state occurring when the differential pressure switch 3 detects a pressure difference exceeding the threshold value. If differential pressure switch 3 is ON, step S2 returns YES and control passes to step S3.

At step S3, the brake failure detector 33 checks the ABS control state of each wheel to check for any failure of the front brake channel. The failure detection method applied by the brake failure detector 33 at this time is described below.

A synchronization flag $SYFLG_i$ and synchronization timer $SYTMR_i$ are set for each wheel. The synchronization flag $SYFLG_i$ indicates whether the corresponding wheel speed is synchronized to the estimated vehicle speed, and the synchronization timer $SYTMR_i$ is used to count the continuous synchronization state time (the time the wheel speed is synchronized to the estimated vehicle speed) of the corresponding wheel.

The brake failure detector 33 thus checks the state of the synchronization flag $SYFLG_i$ and the value of the synchronization timer $SYTMR_i$ for each wheel. If the synchronization flags $SYFLG_0$, and $SYFLG_1$ for both the left and right front wheels are reset, the values of both left and right front wheel synchronization timers $SYTMR_0$ and $SYTMR_1$ exceed a particular value a, and either left or right rear wheel synchronization flag $SYFLG_2$ or $SYFLG_3$ is set or either left or right rear wheel synchronization timer $SYTMR_2$ or $SYTMR_3$ is less than a particular value a, a failure is detected in the front brake channel.

In other words, the brake failure detector 33 determines a failure in the front brake channel if ABS control is applied to neither front wheel (left or right) but is applied to either one of the rear wheels (left or right). Note that an index i where i=0, 1, 2, or 3 (0 being the right front wheel, 1 the left front wheel, 2 the right rear wheel, and 3 the left rear wheel) is used so that the index value can be counted to determine whether all four wheels have been processed. Note, further, that the default synchronization flag $SYFLG_i$ setting is RESET, and the default synchronization timer $SYTMR_i$ value is 255.

Returning to FIG. 4, if ABS control is applied to neither front wheel (left or right) but is applied to one of the rear wheels (left or right) in step S3, a front brake channel failure is detected and step S3 returns YES. At step S4, the brake failure evaluator 34 sets a flag FLG indicating that the front brake channel was evaluated and determined to have failed, and control passes to step S5.

Note that if step S2 returns NO (differential pressure switch 3 is OFF) or step S3 returns NO (front brake failure not detected), this flag FLG is cleared (FLG=0) to indicate that the front brake channel was evaluated and determined to not have failed. Control then passes to step S5.

At step S5, the anti-skid control evaluator 35 resets the index counter i to 0. The index counter counts the index value set for each wheel as described above, and is used later in the control process to determine whether all wheels have been processed.

At step S7, the anti-skid control evaluator 35 then calculates slippage $SP_i$ for the wheel corresponding to the current index counter i (e.g., $SP_0$ if the current index counter i=0, indicating the right front wheel). This slippage $SP_i$ value indicates the amount of wheel slippage relative to the estimated vehicle speed during vehicle braking, and is calculated from the wheel speed $SPEED_i$ calculated by the wheel speed calculator 30, the wheel deceleration calculated by the wheel speed deceleration calculator 31, and the estimated vehicle speed $V_{REF}$ calculated by the estimated vehicle speed calculator 32. Control then passes to step S8.

At step S8, the anti-skid control evaluator 35 determines whether the wheel corresponding to the current value of the index counter i is in an asynchronous state. If it is (YES is returned), it is determined in step S9 whether particular synchronization conditions are satisfied for the wheel corresponding to the current value of the index counter i. If these conditions are not satisfied (NO is returned), control passes to step S10. If these synchronization conditions are satisfied (YES is returned by step S9), the synchronization flag $SYFLG_i$ is reset and the synchronization timer $SYTMR_i$ is cleared to zero (0) at step S11 for the wheel corresponding to the current value of the index counter i, and control then passes to step S10.

If an asynchronous state is not detected at step S8 (=NO), the anti-skid control evaluator 35 determines at step S12 the value of the synchronization timer $SYTMR_i$ for the wheel corresponding to the current value of the index counter i. If $SYTMR_i$ is less than 255, step S12 returns NO, the synchronization timer $SYTMR_i$ is incremented one in step S13, and control then passes to step S10. If the synchronization timer $SYTMR_i$ value is 255 or greater in step S12 (YES is returned), control passes directly to step S10.

The anti-skid control evaluator 35 then determines at step S10 whether the flag FLG is set. If it is (=YES), a predetermined value DTH is added to the slip threshold value $TH_i$, the threshold value used to determine whether the wheel corresponding to the current value of the index counter i is tending to lock, at step S14, and control then passes to step S15 (FIG. 5). If at step S10 the flag FLG is not set (=NO), control passes directly to step S15 (FIG. 5).

At step S15 (FIG. 5), the anti-skid control evaluator 35 checks for locking symptoms in the wheel corresponding to the current value of the index counter i. This is accomplished by determining whether the slippage $SP_i$ for the wheel corresponding to the current index counter i exceeds the slip threshold value $TH_i$. If locking symptoms are not detected (step S15=NO), the anti-skid control evaluator 35 checks the value of the synchronization timer $SYTMR_i$ for the wheel corresponding to the current value of the index counter i. If the timer value is less than the predetermined value a (step S16=NO), the anti-skid control evaluator 35 instructs the solenoid drive controller 36 to calculate the pressure reduction control command value whereby the actuator for the wheel corresponding to the current value of the index counter i is operated to gradually increase the brake fluid pressure (step S17), and control then passes to step S18.

If at step S16 the synchronization timer $SYTMR_i$ is greater than or equal to predetermined value a (step S16= YES), the anti-skid control evaluator 35 instructs the solenoid drive controller 36 at step S19 to terminate ABS control of the wheel corresponding to the current value of the index counter i, and transfer the fluid pressure in the master cylinder 2 directly to the wheel cylinder. Control then passes to step S18.

If locking symptoms are detected at step S15 (=YES), the anti-skid control evaluator 35 sets the synchronization flag $SYFLG_i$ for the wheel corresponding to the current value of the index counter i at step S20, and then determines the state of the flag FLG at step S21. If the flag FLG is set (step S21=YES), the brake fluid pressure reducing time for the wheel cylinder of the wheel corresponding to the current value of the index counter i is set short at step S22 so that the brake fluid pressure is reduced only slightly, and control passes to step S18.

If the flag FLG is not set (step S21=NO), the anti-skid control evaluator 35 sets the brake fluid pressure reducing time for the wheel cylinder of the wheel corresponding to the current value of the index counter i to the normal pressure reducing time at step S23, and control passes to step S18.

At step S18, the anti-skid control evaluator 35 determines whether the wheel corresponding to the current value of the index counter i is a rear wheel. If it is (step S18=YES), the flag FLG state is checked at step S24.

If the flag FLG is set (step S24=YES), braking force control of the rear wheels is set to select-high control at step S25. As previously described, select-high control simultaneously controls the brake fluid pressure of both left and right wheels based on the wheels (left or right) not indicating a tendency to lock. Control then passes to step S26.

If the flag FLG is not set (step S24=NO), braking force control of the rear wheels is set to select-low control at step S27. As previously described, select-low control simultaneously controls the brake fluid pressure of both left and right wheels based on the wheels (left or right) indicating a tendency to lock. Control then passes to step S26.

The anti-skid control evaluator 35 increments the index counter i at step S26, and then at step S28 checks the value of the index counter i to determine whether the process described above has been executed for all four wheels (which is the case when i=4 in step S28). If the process has been completed for all four wheels (i=4 and step S28 returns YES), the solenoid drive controller 36 outputs the brake fluid pressure control command values to the respective actuators 38a, 38b, 38c, and 38d as the solenoid commands therefor (step S29). Control then returns to step S1 in FIG. 4.

If all four wheels have not been processed (i<4 and step S28 returns NO), control loops back to step S7 in FIG. 4.

Figure 6:
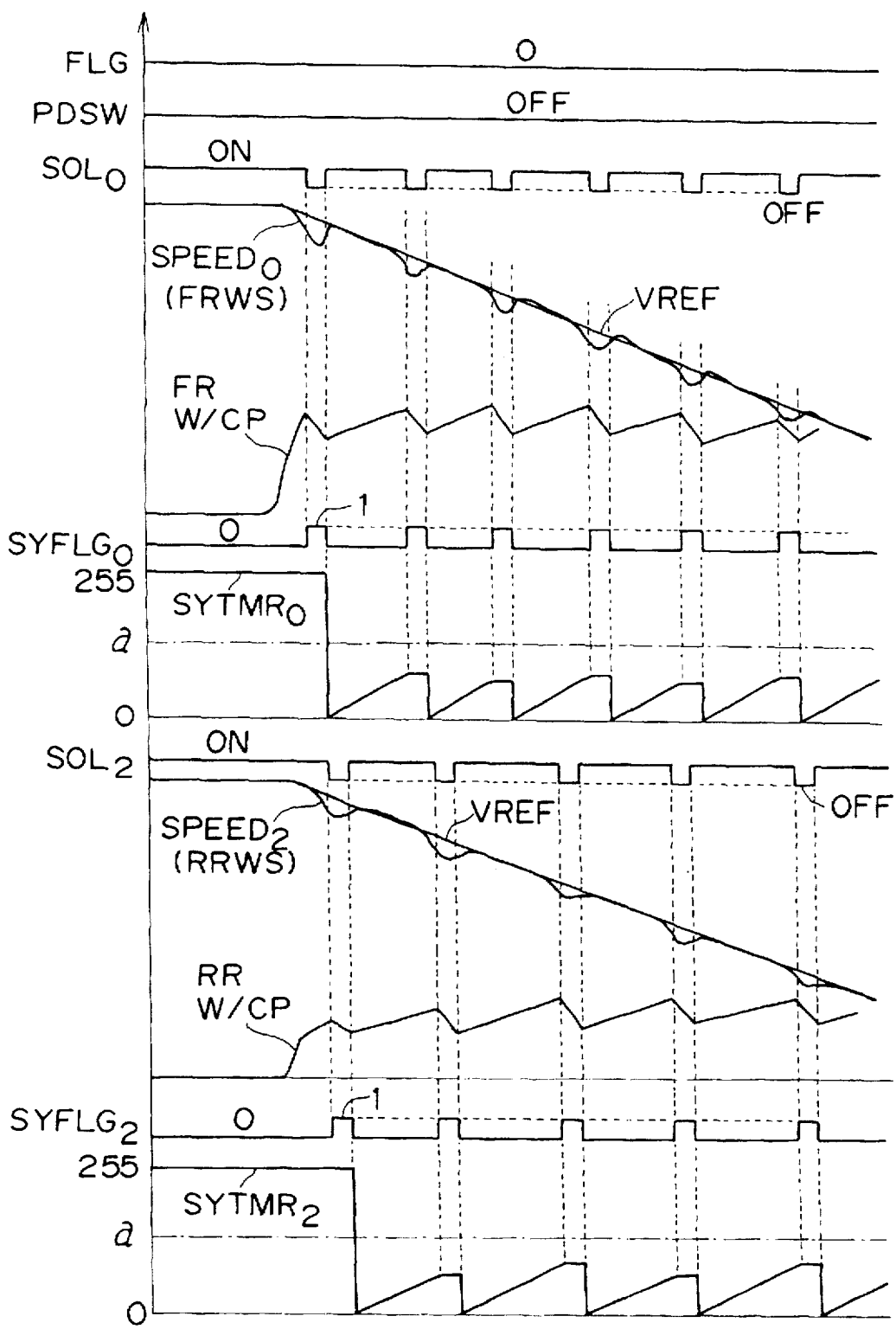
FIG. 6 is a timing chart showing an example of right front and right rear wheel control when the front brake channel is normal and the anti-skid control apparatus shown in FIG. 3 is employed.

FIG. 6 is a timing chart showing the solenoid signals to the actuator ($SOL_0$ and $SOL_2$ shown in the figure by way of example only), the wheel speed, wheel cylinder pressure (W/C), and the synchronization flag and synchronization timer states for the right front and right rear wheels when the brake system is functioning normally for all wheels and the anti-skid control apparatus according to the present invention is used in the antilock brake control system.

Figure 7:
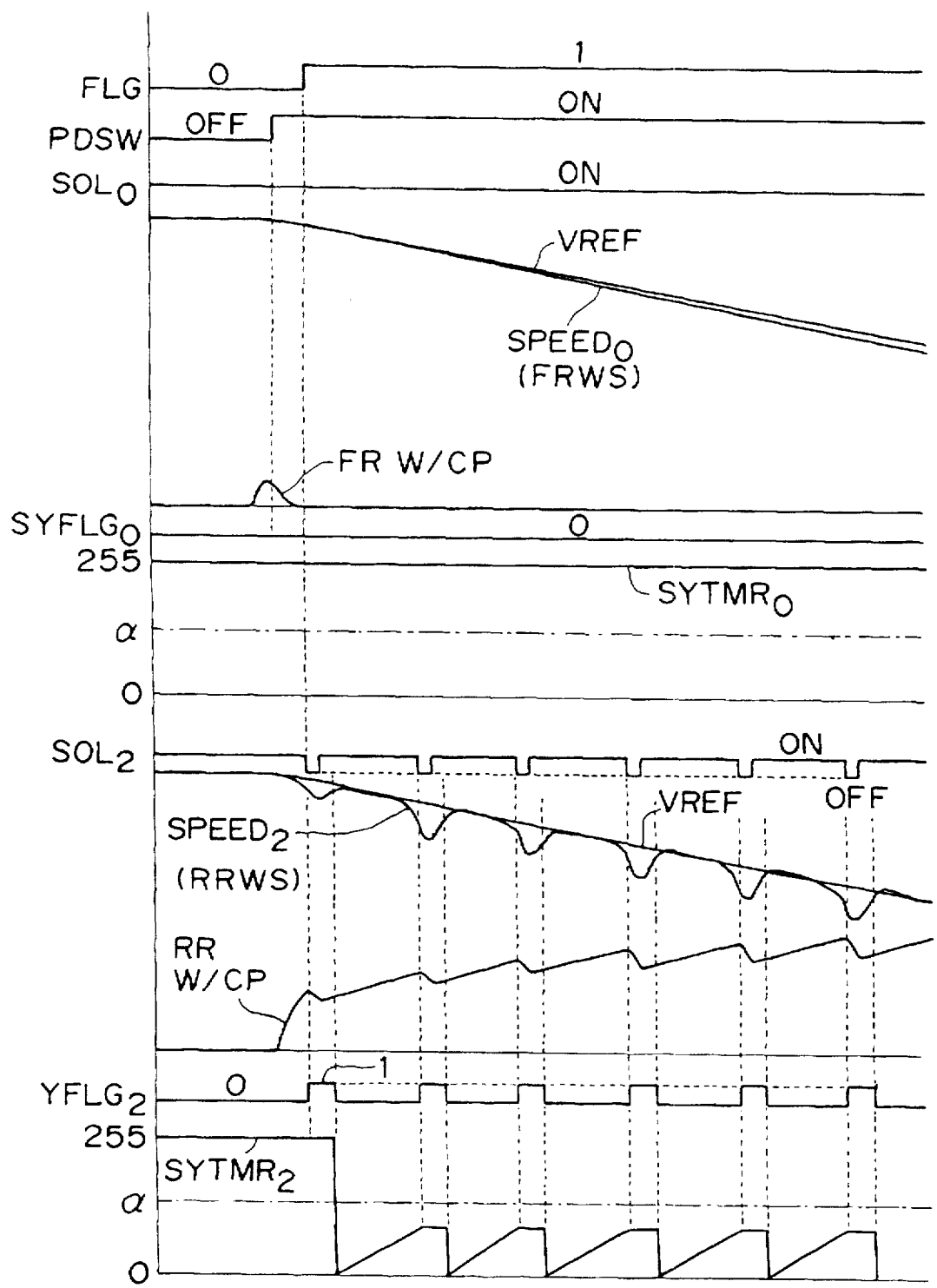
FIG. 7 is a timing chart showing an example of right front and right rear wheel control when the front brake channel has failed and the anti-skid control apparatus shown in FIG. 3 is employed.

FIG. 7 is a similar timing chart showing the solenoid signals to the actuator ($SOL_0$ and $SOL_2$ shown by way of example only), the wheel speed, wheel cylinder pressure (W/C), and the synchronization flag and synchronization timer states for the right front and right rear wheels when the front brakes are not functioning normally (have failed) and the anti-skid control apparatus according to the present invention is used in the antilock brake control system.

As will be known from FIGS. 6 and 7, when the differential pressure switch 3 (shown as differential pressure SW in the figures) is ON because it has detected a pressure difference exceeding a predetermined threshold value between the front and rear brake channels, the flag FLG indicating there is a failure in the front brake channel is set, and a failure in the front brakes is therefore determined, the ABS control method applied to the rear brakes is changed to a particular control method whereby the rear wheels are permitted to skid more than when all brakes are functioning normally.

It is to be noted that while the preferred embodiment above has been described as detecting a failure in the front brake channel, it is also possible to separately check for failure of the left or right front brakes, and appropriately change the ABS control method to another control method.

Note, further, that while a differential pressure switch has been described as the differential pressure detection means a differential pressure sensor outputting an electrical signal that varies linearly to the pressure difference may be alternatively used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular anti-skid control apparatus comprising:

a differential pressure detection means for detecting the pressure difference inside the brake lines of the separate brake channels, and outputting a differential pressure detection signal when the pressure difference exceeds a predetermined level;

a brake failure detection means for detecting failure in one of the brake channels based on the anti-skid control state of each brake channel, and outputting a brake failure detection signal when a brake channel failure is detected; and a brake failure evaluating means for evaluating failure of the brake system when both the differential pressure detection signal and the brake failure detection signal are detected, and outputting a brake failure evaluation signal;

whereby the anti-skid control method is changed from normal anti-skid control to a particular anti-skid control method while the brake failure evaluating means outputs the brake failure evaluation signal.

2. An anti-skid control apparatus according to claim 1 wherein:

the brake failure detection means outputs the brake failure detection signal when anti-skid control is applied to one of the rear wheels but is not applied to either of the front wheels.

3. The anti-ski control apparatus according to claim 2, wherein said particular anti-skid control method accomplishes anti-skid control by setting the wheel slip threshold value used to evaluate wheel slipping to a higher than normal value.

4. The anti-ski control apparatus according to claim 2, wherein said particular anti-skid control method accomplishes anti-skid control by setting the pressure reducing time of the rear brake fluid pressure to a shorter than normal time.

5. The anti-ski control apparatus according to claim 2, wherein said particular anti-skid control method accomplishes anti-skid control by switching rear wheel braking force control between select-low control and select-high control, select-low control being a method wherein the right and left wheels are evaluated for a locking tendency, and the brake fluid pressure of the right and left wheels is simultaneously controlled based on the wheels exhibiting a tendency to lock, and select-high control being a method wherein the right and left wheels are evaluated for a locking tendency, and the brake fluid pressure of the right and left wheels is simultaneously controlled based on the wheels not exhibiting a tendency to lock.

6. An anti-skid control apparatus according to claim 1 wherein:

said particular anti-skid control method accomplishes anti-skid control by setting the wheel slip threshold value used to evaluate wheel slipping to a higher than normal value.

7. An anti-skid control apparatus according to claim 1 wherein:

said particular anti-skid control method accomplishes anti-skid control by setting the pressure reducing time of the rear brake fluid pressure to a shorter than normal time.

8. An anti-skid control apparatus according to claim 1 wherein:

said particular anti-skid control method accomplishes anti-skid control by switching rear wheel braking force control between select-low control and select-high control, select-low control being a method whereby the right and left wheels are evaluated for a locking tendency, and the brake fluid pressure of the right and left wheels is simultaneously controlled based on the wheels exhibiting a tendency to lock, and select-high control being a method whereby the right and left wheels are evaluated for a locking tendency, and the brake fluid pressure of the right and left wheels is simultaneously controlled based on the wheels not exhibiting a tendency to lock.

* * * * *

UNITED STATES PATENT AND TRADEMARK OFFICE
CERTIFICATE OF CORRECTION

PATENT NO. : 5,752,751
DATED : May 19, 1998
INVENTOR(S) : Tohru NAKAURA et al.

It is certified that error appears in the above-identified patent and that said Letters Patent is hereby corrected as shown below:

At column 11, line 39 (claim 3, line 1) of the printed patent, change "anti-ski" to ---anti-skid---.

At column 11, line 44 (claim 4, line 1) of the printed patent, change "anti-ski" to ---anti-skid---.

At column 12, line 1 (claim 5, line 1) of the printed patent, change "anti-ski" to ---anti-skid---.

Signed and Sealed this

First Day of June, 1999

Q. TODD DICKINSON

*Attest:*

*Attesting Officer*     *Acting Commissioner of Patents and Trademarks*